April 12, 1966  B. F. SILVERWATER  3,245,541
FILTER FOR USE UNDER ICING CONDITIONS
Filed Feb. 4, 1963

United States Patent Office 3,245,541
Patented Apr. 12, 1966

3,245,541
FILTER FOR USE UNDER ICING CONDITIONS
Bernard F. Silverwater, Plainview, N.Y., assignor to Pall Corporation, Glen Cove, N.Y., a corporation of New York
Filed Feb. 4, 1963, Ser. No. 256,086
9 Claims. (Cl. 210—307)

This invention relates to a filter assembly with an ice trap for use with fluids containing supercooled water and ice as well as other suspended foreign matter and particularly to a filter assembly having an ice trap for use under icing conditions and which extends useful operation of the filter under such conditions.

Filters are usually used in fuel lines for internal combustion engines to prevent dirt from entering and plugging carburetor jets and other passages in the combustion system. It is not uncommon for water to be present in fuel, and at sufficiently low atmospheric temperatures this water becomes supercooled, and when it contacts a solid cold surface, it crystallizes as ice. Thus, the water can form ice on contact with the filter element. And when the coating of ice becomes sufficiently thick, the ice blocks the passage of fuel through the filter. Such ice blockage may cause the engine to stall, or make starting of the engine impossible. Ice blockage in fuel filters is always undesirable, but is particularly hazardous in aircraft, if the ice formation occurs during flight. Also, ice particles which may form in the fuel storage tanks can be carried by the fuel into the filter bowl, adding to the ice formed there, or on the filter element itself.

Most types of filters and filter assemblies that are now available avoid the difficulty by providing means to by-pass the filter entirely when ice formation prevents flow through the filter. This means that the fuel flow is no longer filtered, which is undesirable. However, there is no provision for maintaining an alternative channel through the primary filter, to continue filtered flow under ice forming conditions, while relaying ice formation on the primary filter element.

It is therefore an object of the present invention to provide a filter assembly which interposes in the path of the fluid a solid cold surface on which the supercooled water in the fuel can crystallize as ice. The surface is in the form of a secondary filter element, having a large surface area for ice collection, and which has a by-pass channel for continuing fluid flow around the secondary filter and through the primary filter when the normal filter flow passages through the secondary filter are blocked by foreign material or ice formation.

Figure 1:
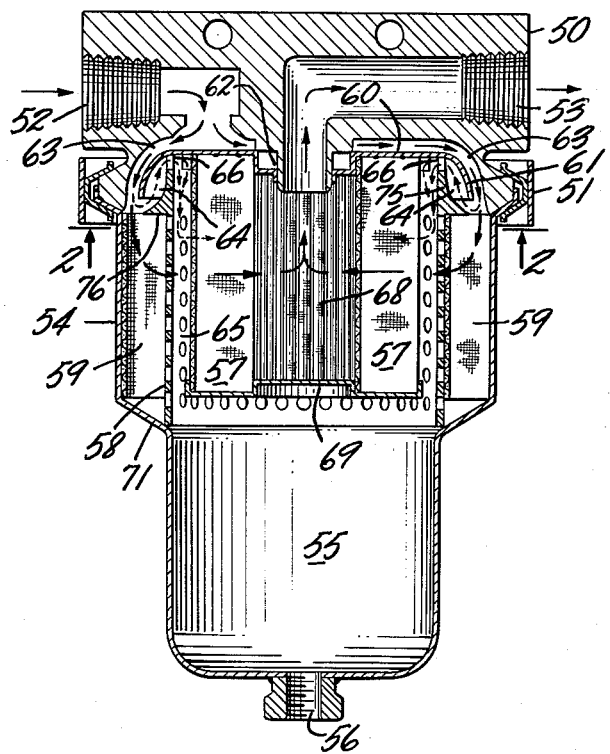

In the accompanying drawings, FIGURE 1 is an elevation in longitudinal section of a filter assembly having an ice trap in the form of a secondary filter element, and a by-pass channel leading around the secondary filter element to a primary filter element.

Figure 2:
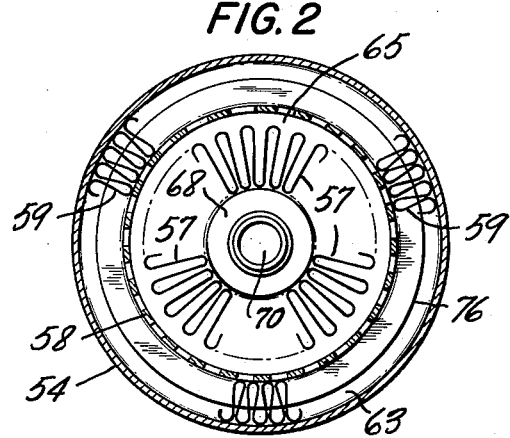

FIGURE 2 is a cross sectional view of the filter assembly of FIGURE 1, taken along the lines 2—2 of FIGURE 1.

The filter assembly of FIGURES 1 and 2 is adapted for use in a fuel line for an internal combustion engine, and has a head 50 with an inlet 52 and an outlet 53, both opening into filter bowl 54. The lower portion of bowl 54 constitutes a sump 55 for collection of liquid and solid contaminant material heavier than fuel, such as water, and a port 56 is provided for drainage from time to time of contaminant material collected in the sump 55. The bowl 54 is held in place on head 50 by means of a V-shaped band clamp 51.

Disposed within the upper section of the bowl 54 are a cylindrical primary filter element 57, an intermediate perforated cylinder core 58 concentrically arranged about the primary filter element 57, and a secondary outer filter element 59 concentrically arranged about the core. A circular baffle in the form of a guard plate 60 having downwardly extending sides 61 is attached to the primary filter element at 62 by any desired means, such as by welding, brazing or soldering. The sides 61 extend partway along the sides of outer element 59. The plate 60 is spaced above the filter 59 and core 58, and from the bowl wall. The space between the outside of plate 60 and bowl 54 constitutes a channel 63 connecting at one end with the inlet 52 and at the other with the interior of the bowl 54. The space between the inside of the plate 60, and the side and top of core 58 and the side of element 57 constitute a by-pass channel 64, which runs over the top of the core and connects with the space 65 within the core 58. Fluid passing through channel 64 into space 65, can proceed further by passing through filter 57. When filter 57 becomes clogged, a relief valve (not shown) designed to open only when a predetermined pressure drop is reached, will furnish a bypass, so that thereafter flow bypasses both filter elements 57 and 59.

The core 58 is provided with a number of lugs 66 engaging the plate 60 attached to filter element 57, and holding it in position, and permitting passage of fluid across the top of the core. The upper portion 75 of core 58 below the lugs 66 is non-perforated, preventing entry of fluid except via channel 64 over the top thereof, and the side wall of the non-perforated portion has an extension 76 which partially closes off the top of element 59.

The core 58 supports the primary element 57 against the head 50 because its lower end engages the indentation 71 of the bowl sidewall, and its top support plate 60 to which the primary filter element 57 is secured.

The primary filter element 57 provides the effective filtering action, and is made of fine sintered wire mesh preferably of stainless steel having deep and wide corrugations to provide ice cake space. The filter element 57 encloses a central passage 68 whose lower end is closed off by bottom plate 69. The top plate 60 has an opening 70 for passage of filtered fluid from central passage 68 to outlet channel 53.

The secondary filter element 59 provides only preliminary filtering action and its primary function is to hold back ice and large particles from the primary element. It can be made of any filter medium, and can have any geometric shape, such as a simple cylinder or in a corrugated configuration, but as shown it is made of coarse corrugated wire mesh, preferably of stainless steel, of a larger mesh diameter than that of the primary filter element 57.

When fluid is pumped into inlet channel 52, it is directed into the flow channel 63 by the plate 60, and thence encounters the outside of the coarse mesh secondary filter element 59. Since its passage is blocked by indentation 71 of the bowl wall, it can only flow through the filter 59 and the perforated core 58, whence it passes through the fine mesh primary filter element 57, enters central passage 68, and exits through outlet channel 53.

When the air temperature is at freezing or below, any water in the fuel and in the secondary filter can and does freeze. Ice particles then enter the filter bowl or form there or on the secondary filter 59. Eventually, the secondary filter 59 becames blocked, preventing passage of fluid through it to the primary filter 57. In this case, fluid now backs up, so that it enters channel 64 to flow by gravity over the top of the plugged secondary filter 59 and of the core 58 into the space 65 enclosed by the core, whence it is free to flow through primary filter element 57 as before. Small ice particles may also flow through the passage 64, and can be pushed down into and collected in sump 55.

This filter assembly under icy operating conditions hence will provide a continuous flow of filtered fluid after a normal filter would have become inoperative, as evidenced by blockage of the secondary filter, and this extended operation with filtered flow will continue until and if the primary filter becomes inoperative, after which an emergency unfiltered flow will continue to be provided.

I claim:

1. A filter assembly for use under icing conditions with fluids containing dispersed water, comprising a filter casing having inlet and outlet passages, primary and secondary filter elements normally in series to the fluid flow, and disposed in the casing across the line of fluid flow from the inlet to the outlet passage so that all flow passes through the primary filter element, a flow channel leading from the inlet to the secondary filter element, an open by-pass channel leading across the top of the secondary filter element to the primary filter element, and a flow-directing baffle means, disposed between the flow channel and the by-pass channel in a manner to direct fluid flow normally to the secondary filter element and obstruct but not close off fluid flow through the by-pass channel to the primary filter element, but allow fluid flow through the by-pass channel to the primary filter element whenever entry to the secondary filter element is blocked by ice.

2. A filter assembly in accordance with claim 1, comprising a plate attached to and supporting the primary filter element, separating the by-pass channel from the flow channel, and defining the baffle means.

3. A filter assembly in accordance with claim 1, comprising an apertured core supporting the secondary filter element.

4. A filter assembly as in claim 3, in which the core has an upper fluid-impervious portion extending beyond the secondary filter elements, serving as a wall of the by-pass channel, and having extensions engaging the plate and engaging the secondary filter element, to position the core and the primary and secondary filter elements in the casing.

5. A filter assembly in accordance with claim 1, in which the filter casing is composed of two cylindrical sections, one of larger diameter than the other, and has a ledge between the two sections acting as a support for the secondary filter element.

6. A filter assembly in accordance with claim 1, in which the secondary filter element is made of coarse corrugated mesh, and the primary filter element is made of fine corrugated mesh.

7. A filter assembly comprising, in combination, a head, inlet and outlet passages therein, a bowl attached to the head, an inner filter element disposed in the bowl, a concentrically disposed outer filter element, independently supported within the bowl, a plate attached to the inner filter element, and extending across the top of the outer filter element, at a point spaced therefrom, forming a baffle means, and defining between the head and the plate a flow chamber, and between the plate and the inner filter element a by-pass channel, the by-pass channel extending from the top of the outer filter element to the exterior side of the inner filter element and providing for flow of fluid from the outlet to the inner element by-passing the outer filter element whenever fluid passage through the outer element is blocked, the head having a central aperture connecting the outlet passage with the interior of the inner filter element and the inlet passage of the head, opening to the flow chamber at a point above the plate.

8. A filter assembly in accordance with claim 7, comprising a perforated core supporting the outer filter element, and having an upper fluid-impervious section extending above that element, and serving as a wall of the by-pass channel.

9. A filter assembly in accordance with claim 8, wherein the bowl has a lower sump portion and a drain therein.

References Cited by the Examiner

UNITED STATES PATENTS

| | | | |
|---|---|---|---|
| 2,612,270 | 8/1952 | Lewis et al. | 210—315 X |
| 2,855,103 | 11/1956 | Wilkinson | 210—315 |
| 2,933,192 | 4/1960 | Gretzinger. | |
| 3,007,579 | 11/1961 | Pall | 210—493 |
| 3,021,955 | 2/1962 | Joyce | 210—132 |

REUBEN FRIEDMAN, *Primary Examiner.*